C. E. McDONALD.
SAFETY APPLIANCE.
APPLICATION FILED FEB. 16, 1920.

1,380,816.

Patented June 7, 1921.
2 SHEETS—SHEET 1.

Inventor
C. E. McDonald

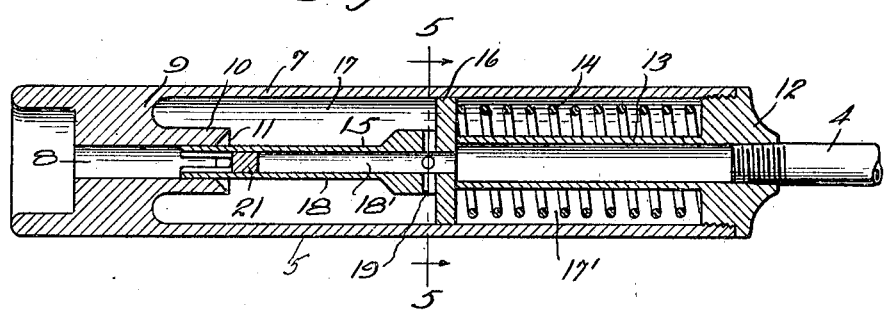
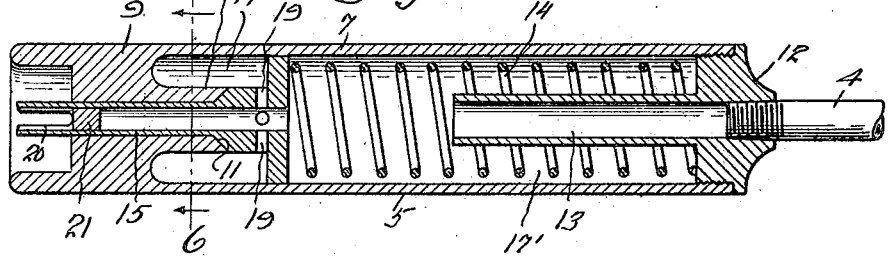
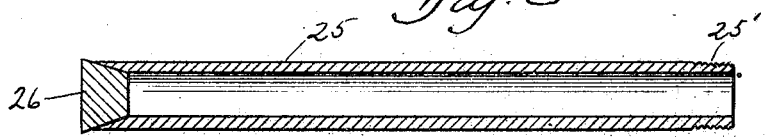
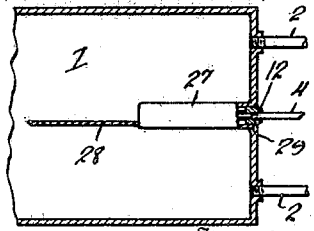
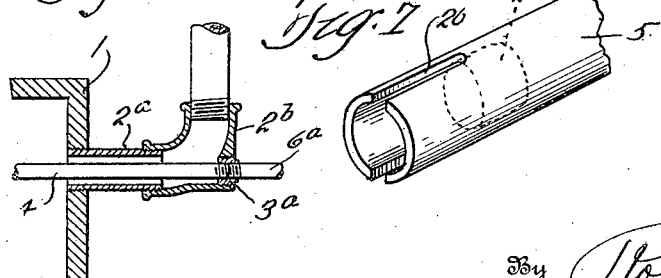
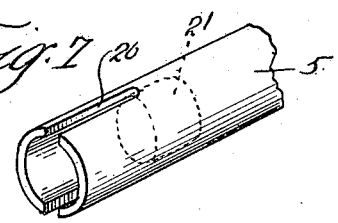

UNITED STATES PATENT OFFICE.

CHARLES E. McDONALD, OF BUTTE, MONTANA.

SAFETY APPLIANCE.

1,380,816.  Specification of Letters Patent.  Patented June 7, 1921.

Application filed February 16, 1920. Serial No. 359,013.

*To all whom it may concern:*

Be it known that I, CHARLES E. McDONALD, a citizen of the United States, residing at Butte, in the county of Silver Bow and State of Montana, have invented certain new and useful Improvements in Safety Appliances, of which the following is a specification.

The present invention relates to improvements in safety appliances especially designed for use in connection with household or other water systems for the purpose of relief of excess pressure.

The invention is devised particularly for disposition in the water fronts of stoves and ranges or similar heating apparatus where the circulation is subject to obstruction due to freezing, stoppage from incrustations or other causes under which condition the effect of the heat produces a sudden excessive expansion of the water or generation of pressure with the frequent result of explosion and injury to persons near the heating means.

The object of the invention under these circumstances is to release the pressure and further to direct the water upon the fire to thus prevent injury to the parts which would be exposed to the heat of the fire.

Another object in view is to provide a device including a valve which is operable by the abnormal pressure when created and of such a construction as to permit of a certain degree of movement under temporary fluctuations of the pressure, not exceeding the safety point, to thereby maintain the valve in a working condition.

A still further object is to provide fusible means in conjunction with the valve aforesaid whereby in the event of failure of the valve to operate the fusible material upon melting will release the pressure.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Fig. 3 is a longitudinal sectional view through my invention, showing the valve member thereof in open or relief position.

Fig. 4 is a similar view showing the valve in its normal closed position.

Figure 5:
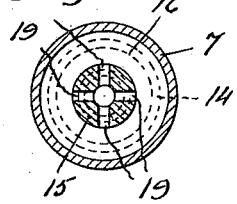
Figure 6:
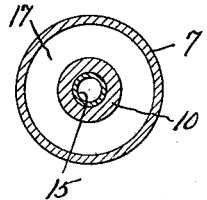

Figs. 5 and 6 are transverse sectional views on the lines 5—5 and 6—6 of Figs. 3 and 4, respectively.

Fig. 7 is an enlarged detail view of the end of the valve member.

Fig. 8 is a sectional view showing a slight modification contemplated by this invention.

Fig. 9 is a fragmentary sectional view showing a different method of assembly.

Fig. 10 is a sectional view of a different type of water front with my invention applied thereto.

Corresponding and like parts are referred to in the following description and indicated in all the views of the drawings by the same reference characters.

Referring to the drawing and specifically describing my invention, 1 designates the conventional type of water front which is usually installed within the heating device, stove, or range as the case may be, and 2, 2 the circulation pipes for the water which is supplied from the customary source. My invention which is in the nature of a safety valve is designed to be installed within the water front as shown most clearly in Figs. 1 and 2. For this purpose the end of the water front is provided with an internally threaded plug or bushing 3 which supports the pipe 4 carrying the valve device 5 at its inner extremity, said device being arranged centrally of the water front at the most desired position.

Figure 2:
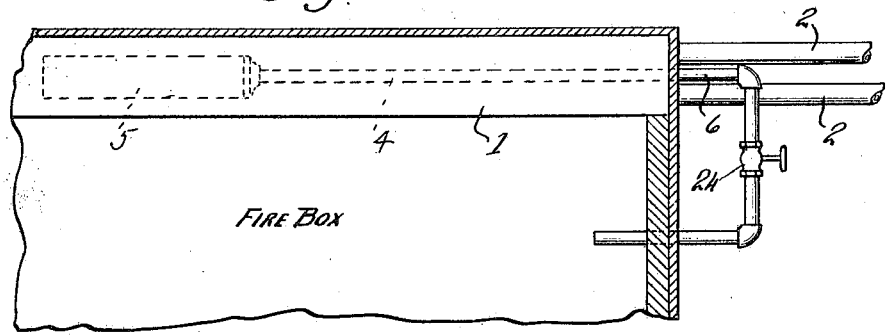
Fig. 2 is a sectional view taken on a plane at right angles to that of Fig. 1, showing a portion of the fire box and the arrangement of the outlet passage to direct the water upon the fire therein in the event of the abnormal condition hereinbefore mentioned arises.

Externally the outlet pipe 4 is continued laterally and terminates within the fire box as shown in Fig. 2 which will be described hereinafter.

The invention lies more particularly as hereinbefore premised in the valve device 5 and reference is now made to Figs. 3 and 4 which show the specific arrangement of this member. The device comprises a cylindrical casing 7 having an inlet passage 8 at one end, which passage is formed by providing a bore through the head 9 which latter is formed with an internally projecting neck 10, terminating in the valve seat 11. The opposite end of the casing is closed by the assembly plug 12, into which the supporting pipe 4 is screwed, the plug being formed with an internally projecting tubular passage 13 extending to a point substantially midway of the casing. This tubular passage constitutes the outlet for the valve device and is surrounded by a coil spring 14 which coöperates with the valve member 15. The head 16 of the valve conforms to the internal diameter of the chamber 17 and is provided with a tubular extension or stem 18 of sufficient length to project into the inlet passage 8 in the manner shown in Figs. 3 and 4. The head is provided with the transverse bores 19 at right angles to each other so as to place the chamber 17 in communication with the interior of the casing at the opposite side of the valve, or the spring chamber 17' through the end of the longitudinal bore of the valve, designated 18'. The end of the stem of the valve member is slotted, as indicated at 20 a short distance longitudinally and adjacent to the end of the slots the passage 18' through the valve is closed by a fusible plug 21.

It will be apparent from the foregoing description that under normal conditions the expansion spring 14 bearing against the head of the valve member 15 will hold the same upon its seat 11 and passage through the casing is thereby effectively closed. The passage through the casing just referred to will remain closed until the valve member is shifted to its innermost position shown in Fig. 3, the movement being limited by abutment of the head 16 against the end of the tubular extension 13. In such position however the passage through the device is open through the slots 20, the chamber 17, the transverse passages 19, and the tubular extension 13. The essential characteristics it will be understood of the valve member will thus appear to be that while the valve may be unseated it will still function to close the passage until it has been shifted to its extreme position, which position is only assumed under an abnormal condition being present in the water front. In other words in the operation of this device it will be apparent that the end of the valve member at the inlet is exposed to pressure conditions existing within the water front and the tension of the spring 14 is such that the valve will be permitted to restrictively yield under the influence of such pressure unless it exceeds a predetermined safety point. The purpose of this is to allow the usual slight fluctuations in pressure conditions to act upon the valve to keep it from sticking or becoming corroded and rendering the device useless for safety purposes. When the pressure from one condition or another rises in the water front to the danger point the valve is shifted to the innermost position and permits the excess pressure and the water from the circulating system to pass through the casing in the manner above specified and the water directed upon the fire to quench the same.

In the event however that for some reason or another the valve member does fail to act as specified, the fusible plug 21 will melt from the excess temperature and will insure the relief of the pressure through the casing by way of the stem passage 18' and the outlet passage 13. This secures additional safety by reason of the particular construction just referred to.

Figure 1:
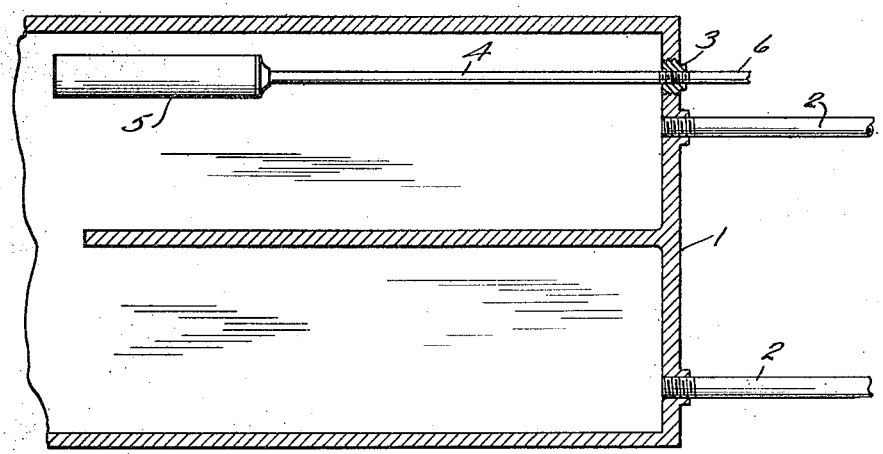
Figure 1 is a sectional view of a water front showing my invention applied in operative position therein.

The valve device is designed to be made of non-corrosive material and of a size which will properly take care of the particular system in which it is installed. In Fig. 9 I have shown a slightly different method of installation in which the elbow 2ᵇ is specially constructed to receive the pipe 4, as by means of the connecting plug 3ᵃ, the passage 4 being thus installed in one of the circulating pipes instead of providing a separate and distinct opening through the water front as shown in Fig. 1. As will be observed the outlet of the safety device is provided with a suitable cut-off 24 so that the entrance of the water into the fire box may be prevented when it is desired, for repair or other purposes.

In Fig. 8 I have depicted a simple form of safety appliance consisting of the tube 25 threaded at one end, as indicated at 25', and having a fusible plug at its other end. This tube may be screwed into the bushing 3 to take the place of the valve type of device hereinbefore described. In Fig. 10 is illustrated a modified form of water front to which the invention may be applied, the casting of the water front being formed with an inwardly projecting extension 27 adjacent to the usual circulation partition 28, which forms a portion of said projection. The entrance to this projection, indicated at 29, is threaded to receive the outlet pipe 4 and the assembly plug 12, as well as the valve 15, all hereinbefore described. It will be apparent from this that the projection 27 merely takes the place of the casing 5 hereinbefore referred to. Other simple modifications may be made without departing from the spirit of the invention and within the scope of the claims hereto appended.

Having thus described the invention, what I claim as new and desire to secure by Letters Patent, is:—

1. In a pressure relief appliance for water fronts, a casing, a relief valve mounted in said casing, said valve having a passage therethrough, and means within said passage normally closing same, said means being adapted to be displaced to relieve abnormal pressure independent of valve movement.

2. A safety appliance of the class described comprising a casing having an escape passage, a valve mounted in said casing and closing the passage therethrough, a seat for said valve, and means carried by the valve for maintaining the passage closed during fluctuations of pressure conditions acting upon one side of the valve and unseating movement thereof responsive thereto.

3. A safety appliance of the class described comprising a casing having an escape passage therethrough, a valve normally closing said passage and adapted to open the same when moved from its seat a predetermined extent, and means carried by the valve for maintaining the passage closed during movements thereof less than the predetermined extent aforesaid.

4. A safety appliance of the class described comprising a casing having an escape passage therethrough, a valve also having a passage through the same and normally closing the escape passage of the casing, said valve being subject to pressure at one side, said passages communicating when the valve is moved a predetermined extent under abnormal pressure conditions, means holding the valve in its normal closed position, and means carried by the valve for maintaining the passage therethrough closed during fluctuations of pressure conditions and unseating movement less than the predetermined extent aforesaid responsive thereto.

5. A safety appliance of the class described comprising a casing having an outlet at one end and an inlet at its other end, a valve mounted in said casing and closing the passage therethrough, said valve having a passage therethrough adapted to establish communication between the inlet and outlet, and a stem passing through and coöperating with the inlet to maintain the same closed while the valve is moving from its seat, the inlet being opened upon the valve reaching a predetermined point controlled by the pressure thereagainst.

6. A safety appliance of the class described comprising a casing having an inlet at one end and an outlet at the other, a valve subject to pressure at one side seated at the inlet and having a passage therethrough, means in the passage closing the same while the valve remains normally seated, the passage through the casing being opened upon movement of the valve a predetermined extent.

7. A safety appliance of the class described comprising a casing having an inlet at one end and an outlet at the other, a valve subject to pressure at one side seated at the inlet and having a passage therethrough, means in the passage closing the same while the valve remains normally seated, the passage through the casing being opened upon movement of the valve a predetermined extent, and pressure means acting against the valve upon its other side from that before mentioned normally tending to hold the valve closed.

8. A safety appliance of the class described comprising a casing having an inlet at one end and an outlet at the other end, a valve therein subject to pressure at one side and having a passage therethrough adapted to establish communication between the inlet and outlet, and fusible means in said passage, the passage through said valve being adapted to be opened about the fusible means upon movement of the valve a predetermined extent.

9. A safety appliance of the class described comprising a casing having an inlet at one end and an outlet at the other, a valve member mounted in said casing and provided with a head at one end and a tubular passage at its other end, said passage coöperating with the inlet, a fusible member disposed in the valve and closing passage therethrough, transverse passages through the valve, said valve being adapted to open passage through the casing when shifted from its seat a predetermined extent under working conditions of the valve, the passage through the valve being adapted to open in the event of non-working conditions of the valve upon fusing of the plug.

10. A safety appliance of the class described comprising a casing having an inlet at one end, a valve member mounted in said casing and having a stem projecting into the inlet, a plug closing the opposite end of the casing and provided with an extension constituting means for limiting movement of the valve, and means surrounding the extension and exerting pressure upon the valve tending to hold the same seated.

11. In combination, a water front, a safety device disposed within the interior of the water front and including a valve casing, a valve member having a passage therethrough mounted in said casing subject at one side to pressure conditions existing in the water front, means in said passage normally closing same, said valve member being adapted to release excessive pressure in the water front upon movement a predetermined extent, and means carried by said valve adapted to maintain the casing closed during movements of the valve less than the predetermined extent aforesaid, the means in said passage being adapted to relieve abnormal pressure independent of valve movement.

In testimony whereof I affix my signature.

CHARLES E. McDONALD.